UNITED STATES PATENT OFFICE.

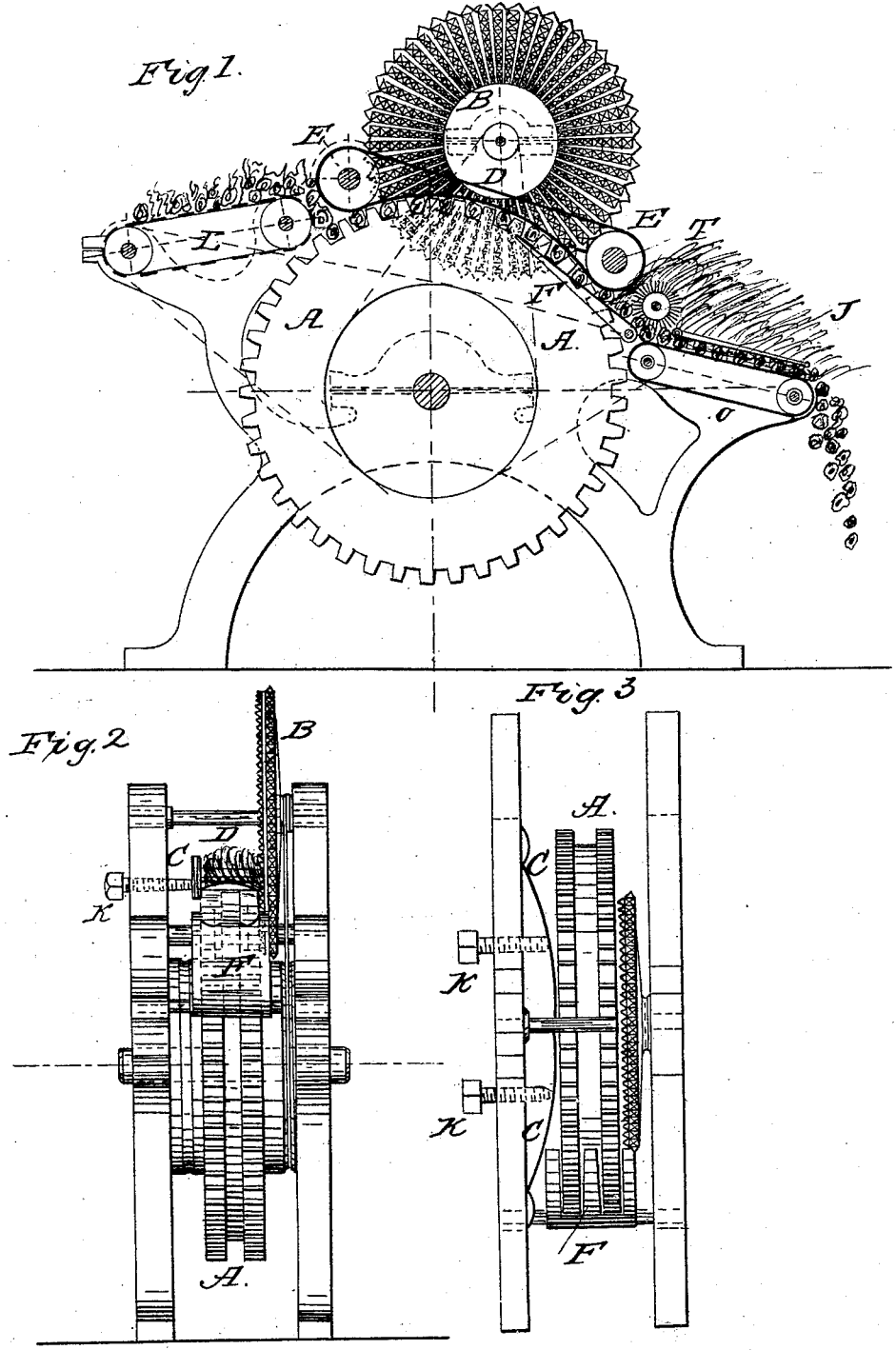

GEORGE R. WALKER, OF WASHINGTON, DISTRICT OF COLUMBIA.

IMPROVEMENT IN CORN-HUSKERS.

Specification forming part of Letters Patent No. 31,637, dated March 5, 1861.

*To all whom it may concern:*

Be it known that I, GEORGE R. WALKER, of Washington, District of Columbia, have invented a new Corn-Husking Machine; and I do hereby declare that the following is a full and exact description thereof, reference being had to the accompanying drawings, and to the letters of reference marked thereon.

Figure 1 represents a sectional elevation with one side of the frame removed; Fig. 2, end view of the same.

The same letters refer to like parts in all the views.

In those machines for husking corn automatically in which a rotary wheel armed with knives is employed to cut off the butt-ends of the ear of corn it has been found impracticable in consequence of the different sizes of the ears of corn to be husked to prevent the larger ears from being cut off above their butts in machines where the ear is not presented to the cutter by hand, thus causing a waste of corn. There is also a difficulty attending such machines when smaller ears of corn are to be operated upon than those for which the machine is adjusted. In this case the springs or other devices which are employed to force the butts of the ear up to the cutting-knives, being adjusted for the ordinary-sized ears, fail to bring the butts under the knives as they rotate, and such ears pass through the machine without being husked, it being well known that the removal of the butts of the husks renders the after process of carrying off such portion of the husks as may remain on the ear comparatively easy.

My invention has for its object the removal of the difficulties attendant on this class of husking-machines; and it consists in the employment of a grinding-wheel to remove the butts of the husks in contradistinction to a rotary wheel armed with knives, the grinding-wheel serving also a guard against which the butts are pressed, thus insuring in all cases the removal of the butts of the ears of corn.

My invention further consists in the combination, with such grinding-wheel, of other parts hereinafter more particularly described.

A is the receiving-wheel with projections or cogs to receive the ear of corn as it is fed to it by the endless apron L, the latter having slats upon it suitably arranged to receive the ears of corn.

E E are rollers for the endless belt D, which presses on the ears of corn to retain them in place.

B is the grinding-wheel, which has on its face corrugations or teeth for grinding off the butts, made by suitable gearing to revolve in an opposite direction to the receiving-wheel A, thereby causing the butt of the ear of corn to come in contact with the surface of the grinding-wheel B.

On the rim of grinding-wheel B are projections for the purpose of cutting off any stalk that may be attached to the ear of corn, or knives attached to the outer periphery of the wheel B may be employed for the same purpose.

F is a fork and guide for raising the ears of corn from the position between the cogs and conveying them, after passing through the machine, to an endless belt armed with teeth, which brings the ears of corn in contact with projections placed above on a hinged apron J, which apron, in connection with the belt O, takes all the husks off the ear, allowing the endless belt to deliver the ear perfectly husked at the end.

L L is an endles belt with projections on it for delivering the corn upon the wheel A.

C C are springs attached to the side frame of the machine, which press upon the points of the ears and force the butt-ends of the ears against the grinding-wheel. These springs may be adjusted by set-screws K K.

Operation of the machine: The ears of corn are placed between the slats on the endless belt L with their butt-ends toward the grinding-wheel B, motion being communicated to the machine by any prime mover. The ears are conveyed by the endless belt and fall into the cogs of the wheel A, and the butts are pressed by the springs C against the wheel B, which revolves in an opposite direction to the wheel A. The ears of corn are held in their position between the cogs by the endless belt D. After the butts are ground off by the grinding-wheel B, which also serves as a guard to prevent the passage of the butts of the ear beyond said wheel, the fork and guide F raises the ears of corn out of their position on the cogs, whence they are conveyed by the endless apron O, armed with teeth, out of the machine, the latter, in conjunction with the hinged apron J, armed with teeth, serving to remove all the husks from the ear, if any remain. A rotary brush T may also be employed to facilitate the removal of such husks as may adhere to the ear.

Having thus fully described my invention, what I claim as new, and desire to secure by Letters Patent, is—

1. The employment of a grinding-wheel to remove the butts of the husks in contradistinction to a wheel armed with cutters, said wheel also serving as a guard for the ears of corn, substantially as described.

2. The combination of the grinding-wheel B, cogged wheel A, and springs C, or their equivalents, substantially as herein described.

3. The combination of the endless apron L, wheels A and B, springs C, endless aprons D and O, and hinged apron J, the whole being constructed and operated in the manner and for the purpose set forth.

GEORGE R. WALKER.

Witnesses:
G. F. BOWIE,
HENRY F. CONDICT.